UNITED STATES PATENT OFFICE.

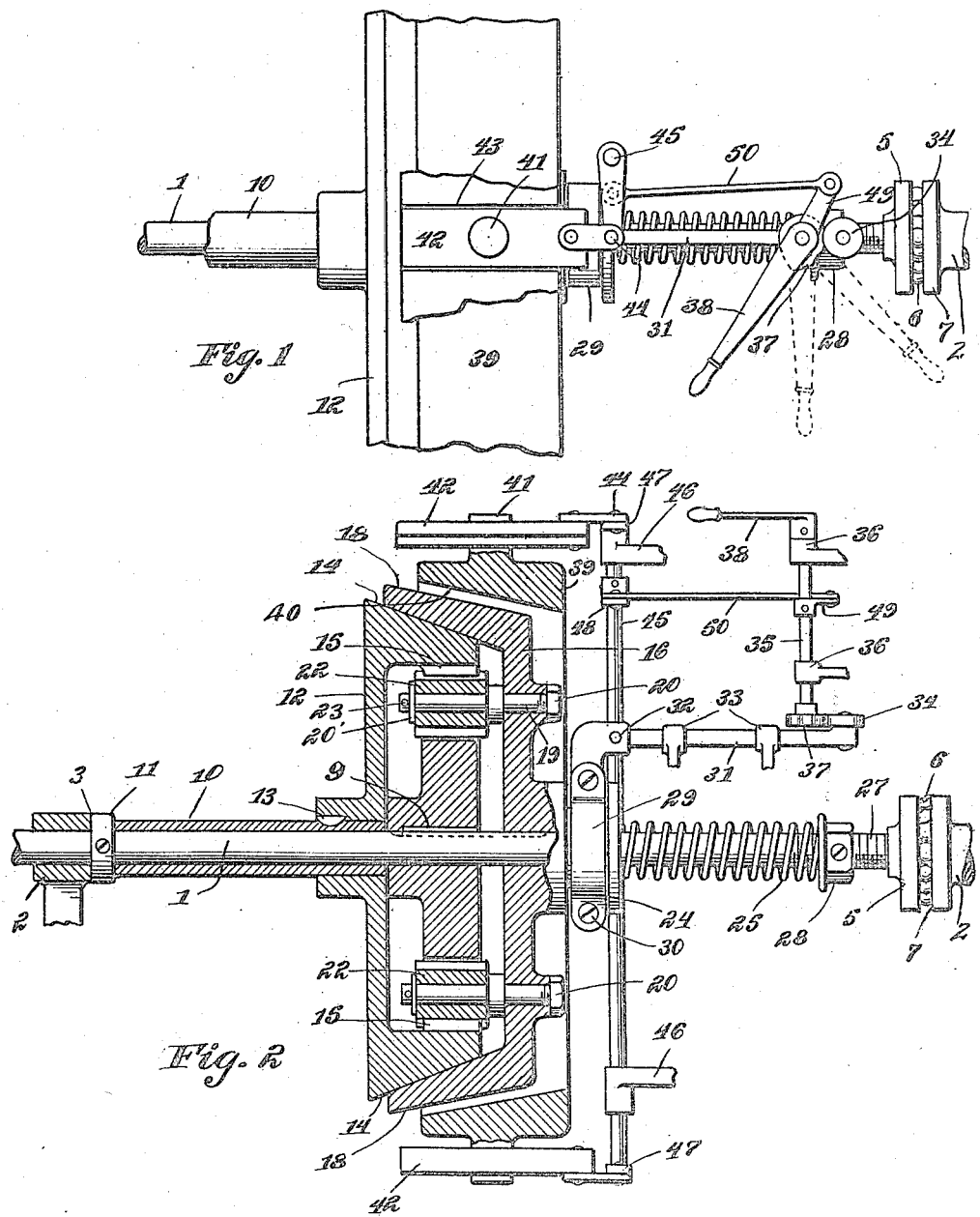

ROBERT J. MILLION, OF MONTICELLO, INDIANA.

REVERSING-CLUTCH.

1,248,370.

Specification of Letters Patent.

Patented Nov. 27, 1917.

Application filed February 13, 1917. Serial No. 148,353.

*To all whom it may concern:*

Be it known that I, ROBERT J. MILLION, a citizen of the United States, residing at Monticello, in the county of White and State of Indiana, have invented new and useful Improvements in Reversing-Clutches, of which the following is a specification.

My invention relates to reversing clutches and particularly to those reversing clutches in which friction surfaces are employed in the various engagements of the parts with one another to accomplish the various functions thereof.

My invention has for its objects; to provide an efficient reversing clutch, second, to provide a reversing clutch which is easily manipulated, thirdly, to provide a reversing clutch having a minimum number of parts and which operates with a minimum loss of power, fourthly, to provide a reversing clutch which is positive in its operation when the parts are associated either for driving forward or driving in a reverse direction therefrom.

I attain these and other objects which will be hereinafter more fully described and particularly pointed out in the claims by the mechanism illustrated in the accompanying drawings, in which:—

Figure 1 is a front elevation of a reversing clutch embodying my invention,

Fig. 2 is a sectional side elevation of the same.

Like characters of reference indicate like parts in the various views.

In the drawings 1 designates a driving shaft which is mounted in stationary bearings 2 of usual construction. Adjacent one bearing a disk 5 is secured to said shaft, and a ball race 6 encircles said shaft and is adapted to engage the outer surface of said plate 5, said ball race 6 also engaging a lateral surface 7 on the adjacent bearing 2 whereby a thrust bearing is provided to prevent longitudinal movement of the shaft in one direction.

A driving gear 8 is provided and is mounted upon the shaft 1, and a key 9, which engages keyways in the shaft and the gear, prevents the gear from rotating respecting the shaft. Rotatably mounted upon the shaft 1 is a sleeve 10, one end of which abuts the hub of the driving gear 8 and the other end of which abuts a clamp collar 11 of usual construction, which is secured to said shaft. Said sleeve 10 is restricted longitudinally by said clamp collar and hub of gear 8, the other side of said clamp collar coöperating with the opposing lateral face of the adjacent bearing 2 to form a thrust bearing adapted to prevent longitudinal movement of said shaft in the other direction relative to said above mentioned thrust bearing. Mounted upon the sleeve 10 is a driven clutch member 12; a key 13, which engages keyways in the driven member and the sleeve, prevents said driven clutch member from rotating respecting the sleeve. A frusto-conical surface 14 is formed at the periphery of said driven clutch member and comprises the clutching surface of the same. An internal toothed surface 15 is formed upon said driven clutch member for purposes hereinafter described.

An idle clutch member 16 is provided and is rotatably mounted upon the shaft 1. Said idle clutch member has an internal clutching surface formed thereon adapted to engage the clutching surface 14 of said driven clutch member, and an external clutching surface 18 formed thereon for purposes hereinafter described. Shouldered studs 19 are provided and are disposed upon the web of said idle clutch member and are secured thereto by projecting through apertured bosses in the said web, nuts 20 being screw threaded upon the ends thereof and clamping the web between the shoulders of the studs and the nuts. Pinions 22 are provided and are mounted for rotation upon the projecting ends of said studs 19, said pinions being restricted as to longitudinal movement between the aforementioned shoulders and washers 20' secured upon the ends of said studs by cotter pins 23 engaging transverse holes in the ends of said studs. A shifting groove 24 is provided in the hub of said idle clutch member. A spring 25 encircles the shaft 1, and one end thereof abuts the hub of said idle clutching members. A clamping nut 28 engages threads 27 formed on the driving shaft and engages the other end of spring 25. Said spring by reason of its engagement with the idle clutch member and the collar 28 tends to hold the internal clutching surface 17 in engagement with the clutching surface 14 hereinbefore described. The threaded engagement of clamping screw 28 with the driving shaft 1 allows the spring tension to be adjusted. A shifting collar 29 is provided and engages the groove 24 of said idle clutch member, said collar being split and clamped together by screws 30 to allow the assembly of the same within the groove 24. A rod 31 engages a hole in said shifting collar and is secured therein by the taper pin 32. Bearings 33 are provided for said rod and permit longitudinal movement thereof. A roller 34 is rotatably mounted upon the outer end of said rod. A cam shaft 35 is provided and is mounted for rotation in bearings 36. A cam 37 is affixed to said shaft and is adapted to engage said roller 34, and a handle 38 is mounted upon the outer end of said shaft, said handle being formed for convenient manual manipulation. The cam 37 is so formed relatively to the roller 34 that when the lower portion of the cam is in engagement with said roller the idle clutching member is permitted to assume its extreme inward longitudinal movement under the influence of the spring 25. When by reason of the rotation of the cam shaft 35, the roller 34 is in engagement with the high portion of said cam, said clutch member is in its extreme outer longitudinal position for purposes hereinafter described.

A stationary clutch ring 39 is provided having an internal clutching surface 40 formed thereon adapted to engage the external clutching surface of said idle clutch member. Studs 41 extend from the outer periphery of said stationary clutch ring and engage holes in slide blocks 42. Said slide blocks 42 engage slides 43 formed upon a stationary portion of the frame structure, said slide bearing being disposed parallel to the shaft 1 whereby said stationary clutch ring 39 may be moved longitudinally of the axis of said shaft. Projections are formed on the outer surfaces of said slide blocks 42 and are engaged by transversely extending shifter studs 44. A rock shaft 45 is provided and is mounted for pivotal movement upon bearings 46 of the frame structure. Arms 47 are formed at the ends of said rock shaft and their outer ends engage respective shifter studs 44. A lever 48 is affixed upon the rock shaft 45, and a similar lever 49 is mounted upon the cam shaft 35. A connecting rod 50 has its opposite ends pivotally mounted upon the free ends of said levers 48 and 49.

It will be noted that in using the terms driving and driven in this specification I do not restrict myself to applying power to the drive shaft 1 and transmitting power through the mechanism to the sleeve 10, said terms being used merely to designate the different parts.

In the operation of the device power is applied to the shaft 1, and transmitted therefrom to the gear 8. In the position of the parts as shown in Fig. 2 of the device the clutch is set for driving in a forward direction, power is transmitted from the shaft 1 to the driving gear 8 to the pinions 22. The clutch surface 14 of the driven clutch member 12, by reason of the influence of spring 25, as hereinbefore described, is held in engagement with the internal clutching surface 17 of the idle clutch member. By reason of this engagement, the pinions 22 in their engagement with the internal toothed surface 15 of the said driven clutch member cannot rotate respecting said driven clutch member, and by reason thereof act as driving dogs interposed between said driving gear 8 and said driven clutch member and the shaft 1, and the sleeve 10 rotates in the same direction and at the same rate of speed.

When the handle 38 is manipulated to withdraw the idle clutch member 16 from its engagement with said driven clutch member 12 the driving connection between drive shaft 1 and sleeve 10 is broken and the idle clutch member by reason of the engagement of the pinions 22 with driving gear 8 and internal toothed surface 15, rotates in the same direction as does the shaft 1 but at half the speed. Upon further movement of the handle 38 the idle clutch member 16 is moved farther until the external clutch surface 18 thereof engages the internal clutch surface 40 of the stationary clutch ring. By reason of this engagement the rotation of the idle clutch member is stopped and the studs 19, affixed thereto, stop with it. In this position the power which is transmitted to the shaft 1 is transmitted to the pinions 21 which rotate under the influence thereof and drive said driven clutch member 12, through the engagement of said pinions with the internal toothed surface 15, in the opposite direction from the shaft 1 whereby the rotation of shaft 1 in being transmitted through the mechanism is reversed and the sleeve 10 rotates in the opposite direction thereto.

The stationary clutch ring 39 through its connections with the cam shaft 35, hereinbefore described, moves in the opposite direction respecting the idle clutch member 16 whenever said clutch member is moved longitudinally through the manipulation of the cam 37. By reason of this movement of the stationary clutch ring the necessary movement of said idle clutch ring 16 is lessened at the same time allowing sufficient space between the disengaged clutching surfaces so that no drag or friction results therebetween by said disengaged surfaces being in partial engagement by reason of any inequalities thereon.

The ball thrust is provided, as hereinbefore described, to eliminate friction when the mechanism is in its reversing position and the spring 25 is compressed between the shifting collar 29 and said idle clutch ring to hold the same in engagement with the stationary ring 39. In this position the thrust of said spring is transmitted through the collar 28 to the shaft 1 and tends to move said shaft longitudinally in the direction of said ball thrust. However, when the device is in its forward driving position the shaft 1 has no longitudinal moving tendency by reason of spring 25, because the spring 25 holds said idle clutch ring in engagement with said driven clutch member 12, said spring being held in compressed relation with said idle clutch member by the clamp collar 28 and clamp collar 11 bearing against the sleeve 10. It will be noted that in this position the driving parts of the device are held stationary respecting each other, and that the tension of spring 25 produces no friction between the different moving parts for this reason.

From the foregoing description it will be seen that I have provided a reversing clutch of a very compact form and requiring but few parts in its construction. The construction of the device enables the friction surfaces to be so constructed and associated that no friction and consequent loss of power is present, as results from the said disengaged friction surfaces being constantly in partial engagement.

Having thus fully described my invention, I claim:—

1. In a device of the character described, a stationary clutch ring adapted for longitudinal movement, a driven clutch member mounted for rotation and having a toothed surface thereon, an idle clutch ring mounted for rotation and for longitudinal movement, a driving gear, pinions mounted for rotation on said idle clutch member and engaging said toothed surface and said driving gear, said idle clutch member having a face thereon engageable with a face of said stationary clutch ring when moved to one extremity of its longitudinal movement and having an opposite face thereon engageable with a face on said driving clutch member when moved to the other extremity of its longitudinal movement, means for moving said idle clutch member longitudinally and a second means in operable relation with said first mentioned means and said stationary clutch ring whereby, when said idle clutch member is moved longitudinally, said stationary clutch member is moved longitudinally in the opposite direction.

2. In a device of the character described, a shaft, a driving gear mounted thereon, an idle clutch member mounted for rotation and for longitudinal movement upon said shaft and having a groove and having a face thereon, pinions rotatably mounted on said idle clutch member and engaging said driving gear, a driven clutch member having a toothed face engaging said pinions and having a face thereon engageable with said face on said idle clutch member, a collar mounted on said shaft, a coil spring encircling said shaft and disposed between said collar and said idle clutch member, a shifting collar engaging said groove on said idle clutch member, a manually operated cam in operable relation with said shifting collar whereby said clutch ring may be shifted longitudinally against the influence of said spring, said face on said idle clutch member being engaged with said face on said driven clutch member when said idle clutch member is at one extremity of its longitudinal movement under the influence of said spring, and locking means engageable with said idle clutch member when said idle clutch member is moved longitudinally against the influence of said spring in the other direction.

3. In a device of the character described, a driving gear, an idle clutch member having a groove, pinions mounted for rotation on said idle clutch member and engaging said driving gear, a driven clutch member having a toothed surface engaging said pinions, a shifting collar engaging said groove on said idle clutch member, a cam in operable relation therewith whereby said idle clutch member may be shifted longitudinally, a stationary clutch ring mounted for longitudinal movement, and means in operable relation with said cam whereby said stationary clutch ring is moved longitudinally in an opposite direction respecting the movement of said idle clutch member.

4. In a device of the character described, a driving gear, an idle clutch member having a groove, pinions mounted for rotation on said idle clutch member and engaging said driving gear, a driven clutch member having a toothed surface engaging said pinions, a shifting collar engaging said groove on said idle clutch member, a cam in operable relation therewith for moving said idle clutch member longitudinally in one direction, spring means for moving said idle clutch member in the other direction, a stationary clutch ring mounted for longitudinal movement, a means connected with said stationary ring and having operable relation with said cam whereby when said idle clutch member is moved longitudinally said stationary clutch ring is moved in the opposite direction.

5. In a device of the character described, a drive shaft, a pair of bearings, in which said shaft is journaled, adapted to restrict longitudinal movement of said shaft, a driving gear fixedly mounted on said shaft at a point intermediate said bearings, a driven clutch member journaled on said shaft on one side of said gear and having a toothed surface and a face, an idle clutch member mounted for rotation and for longitudinal movement on the other side of said driving gear and having a pair of opposing faces, pinions mounted for rotation on said idle clutch member and engaging said driving gear and said toothed surface, said face on said driven clutch member being engageable with one of said faces on said idle clutch member when said idle clutch member is moved to one extremity of its longitudinal movement, a stationary clutch ring mounted for longitudinal movement and having a face thereon engageable with the other of said faces on said idle clutch member when said idle clutch member is moved to the other extremity of its longitudinal movement, a collar secured on said shaft adjacent said idle clutch ring, a coiled compression spring encircling said shaft between said collar and said idle clutch member, a second means for moving said idle clutch member against the influence of said spring, and a second means connected to said stationary clutch member and having operable relation with said first mentioned means whereby said stationary clutch member is moved longitudinally in an opposite direction when said idle clutch member is moved longitudinally.

In testimony whereof I affix my signature.

ROBERT J. MILLION.

Copies of this patent may be obtained for five cents each, by addressing the "Commissioner of Patents, Washington, D. C."